Jan. 21, 1941.  W. OSENBERG  2,229,585
ELECTRICAL CONTACT
Filed July 26, 1937  3 Sheets-Sheet 1

INVENTOR
W. Osenberg
BY
[signature]
ATTORNEY

Jan. 21, 1941.  W. OSENBERG  2,229,585
ELECTRICAL CONTACT
Filed July 26, 1937  3 Sheets-Sheet 2

INVENTOR
W. Osenberg
BY
ATTORNEY

Jan. 21, 1941. W. OSENBERG 2,229,585
ELECTRICAL CONTACT
Filed July 26, 1937 3 Sheets-Sheet 3
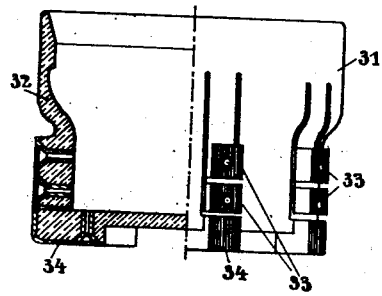
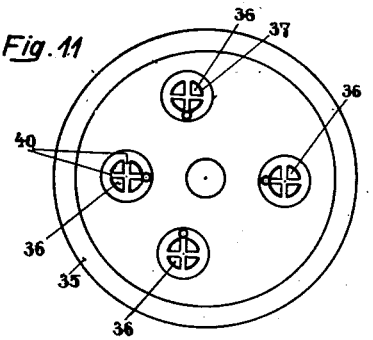
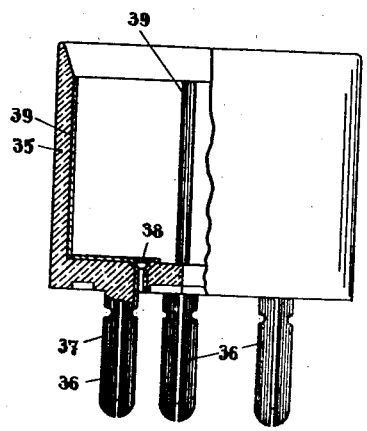
W. Osenberg
BY
ATTORNEY Patented Jan. 21, 1941

2,229,585

UNITED STATES PATENT OFFICE 2,229,585

ELECTRICAL CONTACT

Werner Osenberg, Dresden, Germany, assignor to "Kerb-Konus" G. m. b. H., Dresden, Germany Application July 26, 1937, Serial No. 155,818
In Germany February 4, 1937

8 Claims. (Cl. 173—328)

This invention relates to a new and improved type of electrical apparatus whereby materials formerly considered impractical are rendered capable of new uses and applications in the electrical arts.

During the manufacture of ceramic bodies by molding and baking or the manufacture of dielectrics from resins, condensation products such as phenolic condensation products, urea formaldehyde resins, etc., and polymerization products, etc., they acquire a somewhat definite shape but in many cases the precise dimensions of the completed article cannot be determined and set in advance. Consequently, it is not possible to adjust with absolute precision the desired interval between the electric conducting surface and the electric conducting surface on a companion piece which is to cooperate in order to establish an electrical circuit. As a rule such dielectrics had to be accepted as they were because such ceramic bodies and the like were in common practice considered to be absolutely rigid. It is an object of the invention to improve constructions of this type because according to the invention the conductive portions of a ceramic body or dielectric body of this type may be made somewhat elastic by cutting out tongues, grooves, recesses and the like.

In some cases the dielectric body so rendered resilient or somewhat elastic in part may be used by itself in the electrical arts but generally is used in cooperation with another element.

It is an object of the invention to modify dielectrics of the type indicated by means of tongues, spirals or the like so as to provide in what ordinarily is considered a practically rigid body sufficient elasticity ot permit an electrically conductive layer on such bodies to come into a position that will influence the electrical condition.

It is a further object of the invention to regulate the extent of the elasticity provided in dielectrics of the type indicated by properly selecting the type of weakening cut desired in each case. For example, a spiral shape for some situations or a strip extending around a cylindrical body in other cases.

It is a further object of the invention to render dielectrics upon which a metallic coating constitutes the electrical lead suitable for use in all electrical situations. Such electrical coating may be provided upon the dielectric by spraying or fusing or any other desired process.

A further object of the invention is to provide structures ordinarily considered of rigid material somewhat elastic so that proper electrical contacts might be made with the use of such material or induction effects obtained heretofore considered impossible.

A further object of the invention is to provide modifications in the structure of dielectrics composed of ceramic materials and artificial resins whereby such modifications will eliminate the deficiencies inherent in such structures due to their manufacture or inherent in the dielectric material itself.

With these and other objects which will become apparent from the particular description below, the invention resides in the combination of elements and parts hereinafter set forth, claimed in the claims, and shown in the drawings, in which:

Fig. 10 is a cross sectional view with parts shown in elevation of another type of tube base having the invention applied thereto;

Fig. 11 is a bottom plan view of the form of construction shown in Fig. 12;

Fig. 12 is a cross sectional view of another type of tube base with parts shown in elevation.

Figure 1:
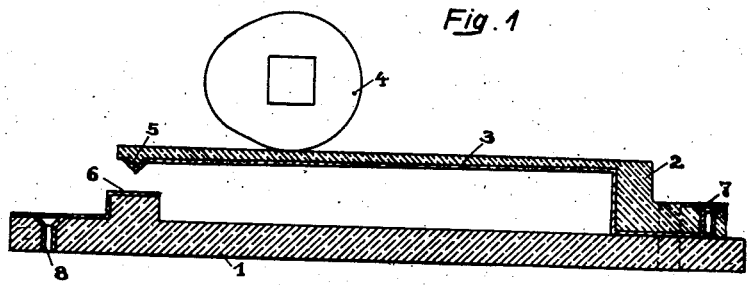
Fig. 1 is a cross sectional view of an electrical switching element.
Figure 2:
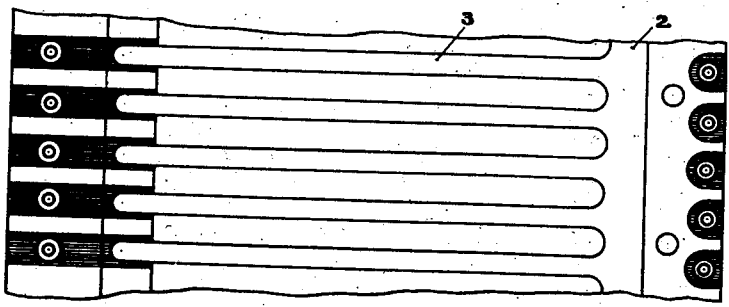
Fig. 2 is a top view of the switching element shown in Fig. 1.

Referring to the drawings, in which like parts have like reference characters, I indicates a base plate which is made from ceramic insulating material or from the resin materials set forth above, on which there is secured a comb-shaped member 2 having elastic contact tongues 3 which also are formed from the dielectric materials outlined above. These contact tongues are made so thin that on being urged downwardly by the eccentric cam discs 4 they will bend downwardly until their contact lugs 5 contact the contact ledge 6 provided upon the base plate 1. The contact lugs 5 and the contact ledge 6 are formed by metallic coatings provided upon the ceramic or dielectric material itself. These coatings may be sprayed or fused on.

The contact coating 6 on the base plate 1 is conductively connected to the soldering joints 8 and the contacts 5 on the lower side of the contact tongues 3 are conductively connected by the coatings above mentioned to the soldering joints 7. These conductive connections may be fused on switch strips or metallic coatings or layers as above mentioned.

In some cases where use is made of high frequency currents, an alteration of the distance interval between the contacts 5 and 6 is sufficient to produce an alteration of the electrical condition without the necessity of bringing the contacts 5 and 6 into contact.

It is also possible to adjust or vary the electrical conditions to an extremely great extent by having a plurality of tongues cooperate with a plurality of corresponding opposing surfaces.

Figure 3:
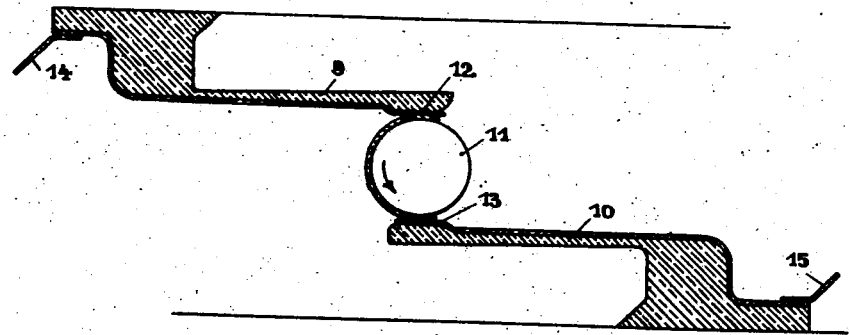
Fig. 3 is a modified switch construction shown in cross section.

The embodiment shown in Fig. 3 relates to a switch that has contact tongues 9 and 10 which are provided with conductive surfaces or coatings and the contact tongues are themselves formed of dielectric material of the type indicated above. In this case the closing of the switch is brought about by means of the rotatable cylinder 11 which is also made of dielectric material and has on its surface a metallic coating of the desired extent and type. Connection strips formed by means of spraying a coating thereon, for example, lead to the connection junctions 14 and 15 from the contact coatings 12 and 13 upon the elastic tongues 9 and 10.

Figure 4:
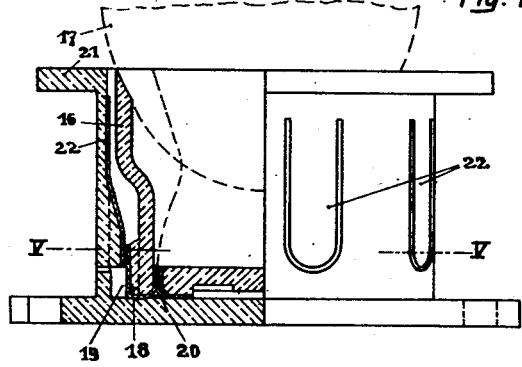
Fig. 4 is a cross sectional view with part shown in elevation of a tube socket having the invention incorporated therein.

In Fig. 4 there is shown a tube base 16 made of ceramic material or the like which has its top edge fused to the glass body 17 of a vacuum tube or the like. The tube base 16 has bracket type projections 18 which are provided with electric conducting coatings 19 which in turn are conductively connected with the soldering joint or juncture 20. The base 16 is inserted in a sleeve type socket 21 which is likewise formed of ceramic material and has at intervals around its circumference U-shaped tongues 22. The tongues 22 are provided with conductive coatings 23 which contact against the corresponding contact coatings 19 provided upon the bracket type lugs 18 on the tube base 16.

Figure 6:
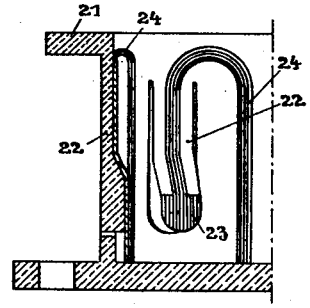
Fig. 6 is a partial cross sectional view illustrating a detail of the socket shown in Fig. 4.
Figure 5:
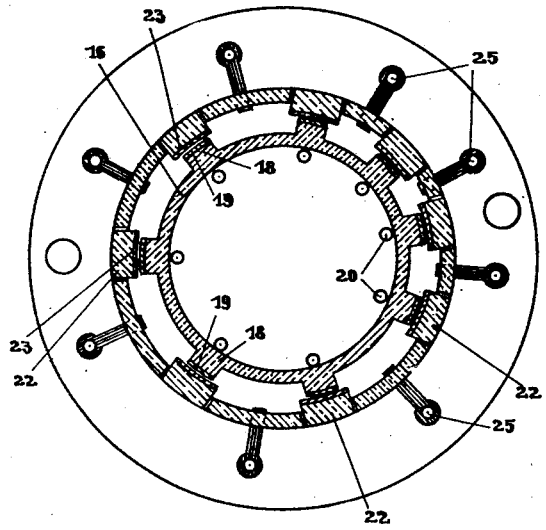
Fig. 5 is a sectional view taken on the section line V—V of Fig. 4.

As may be seen from Fig. 6 connection strips 24 are fused on or sprayed on the cylindrical inside wall of the socket 21. These thin metallic coatings lead from the contact coatings 23 of the tongues 22 through the wall of the socket 21 to the connection points 25 provided on the circular base plate of the socket 21. The thickness of the tongues 22 are kept as thin as possible at the points where they are connected with the socket body in order to secure as much elasticity as possible.

Figure 7:
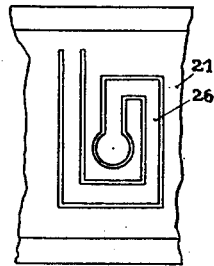
Fig. 7 is a partial elevational view of a modified form of a tube base construction.

In order to increase the elastic effect, the elastic contact tongues 26 as shown in Fig. 7 may be provided. These are of spiral shape in order to provide a greater length or they may be of the well known meander pattern.

Figure 8:
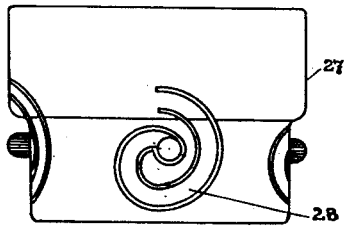
Fig. 8 is a partial elevational view showing a further modified structure.

In Fig. 8 the main body 27 is provided with long tongues 28 cut out in the form of a round spiral in order to secure greater elasticity.

Figure 9:
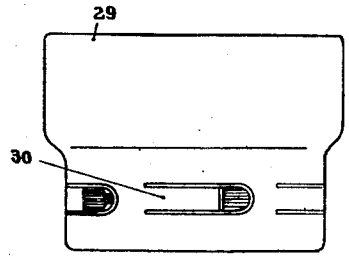
Fig. 9 is a partial view illustrating another modification.

In Fig. 9 there is shown a further modification in which the main body 29 in the form of a hollow cylinder is provided with longitudinally extending elastic tongues 30. In the embodiment shown in the drawings, several such tongues are shown distributed at intervals but obviously a single tongue may extend more or less over the entire circumference of the cylindrical body Furthermore, the tongues may extend spirally in several windings.

In Fig. 10 there is another type of tube base 31 which is formed of dielectric material of the type indicated, such as ceramic material particularly which is provided with elastic contact tongues 32 which in turn have several subdivided conductive coatings forming contact surfaces 33 which are provided with soldering holes. The outer bottom surface of the base has conductive coating bracket type contact lugs 34 which are also provided with soldering junction holes.

Figs. 11 and 12 illustrate a tube base 35 made of ceramic insulating material, which base has its lower side provided with the projections 36 which are integral with the base. These plug or pin projections are provided with a metallic coating 37 which may be produced by a spraying process or the like. The pins 36 are provided with apertures 38 which are also provided with conductive coatings which will provide the electrical connection between the contact strips 39 furnished within the ceramic body. The projections 36 are made elastic by providing them with the longitudinal slits 40.

As is obvious from the above description, the embodiments described are merely illustrative of a large number of applications of the invention in the electrical arts.

The main feature of the invention is the rendering of dielectrical bodies ordinarily considered too rigid, sufficiently elastic and flexible to be applied in a vast number of instances and to simplify constructions ordinarily used. Substances that are formed of ceramic materials and material similar thereto are not of themselves elastic. Also ceramic bodies and substances similar thereto which have first to be shaped and thereafter baked cannot have their dimensions exactly predetermined to fractions of an inch in order to secure perfect contact when two of such surfaces are brought together. Even if the surfaces were prepared by grinding or the like before application of an electrically conductive coating, it would still be impossible as a rule to equalize the difference that results from the baking process and especially so with respect to relatively large bodies. Also as indicated above, the invention is not limited to elements forming electrical connections but single elements having electrical coatings thereon may be utilized in the art due to the variations in induction effect produced. Such induction effects may be accomplished by the use of a cylindrical body, a body in the form of a hollow sphere, or in the form of a plate with spiral cuts or cut therein. The applicability of these forms depends upon the basic concept of rendering ceramic bodies somewhat elastic or resilient either in whole or in part.

I claim:
1. A socket for use in the electrical arts comprising a cup-shaped body of rigid non-conducting material, slits in the side of said body to form resilient tongues and electrical leads on said tongues.
2. A socket for use in the electrical arts comprising a cup-shaped body of rigid non-conducting material, slits in the side of said body to form resilient tongues and electrical leads sprayed on said tongues.
3. A device of rigid non-conducting material for use in the electrical arts having slits therein to form a resilient tongue and an electrical lead on said tongue.

4. A device of rigid non-conducting material for use in the electrical arts having spiral slits therein to form a spiral resilient tongue and an electrical lead on said tongue.

5. A device of rigid non-conducting ceramic material for use in the electrical arts having slits therein to form a resilient tongue and an electrical lead on said tongue.

6. A device of rigid non-conducting synthetic resin material for use in the electrical arts having slits therein to form a resilient tongue and an electrical lead on said tongue.

7. A socket for use in the electrical arts comprising a cup-shaped body of rigid non-conducting ceramic material, slits in the side of said body to form resilient tongues and electrical leads on said tongues.

8. A socket for use in the electrical arts comprising a cup-shaped body of rigid non-conducting synthetic resin material, slits in the side of said body to form resilient tongues and electrical leads on said tongues.

WERNER OSENBERG.